United States Patent
Marb et al.

(10) Patent No.: US 11,927,941 B2
(45) Date of Patent: Mar. 12, 2024

(54) DATA SYSTEM FOR ORGANIZING WORKFLOWS, IN WHICH THE COOPERATION OF HUMAN BEINGS AND MACHINES IS CONTROLLED INTRA-LOGISTICALLY WITH OPTIMUM PROTECTION FOR THE HUMAN BEINGS INVOLVED, AND METHOD FOR INSTALLATION THEREOF

(71) Applicant: GRENZEBACH MASCHINENBAU GMBH, Asbach-Bäumenheim (DE)

(72) Inventors: Philipp Marb, Rain (DE); Erwin Herre, Buchdorf (DE)

(73) Assignee: GRENZEBACH MASCHINENBAU GMBH, Asbach-Baumenheim (DE)

( * ) Notice: Subject to any disclaimer, the term of this patent is extended or adjusted under 35 U.S.C. 154(b) by 71 days.

(21) Appl. No.: 16/646,026

(22) PCT Filed: Sep. 20, 2018

(86) PCT No.: PCT/DE2018/000261
§ 371 (c)(1),
(2) Date: Mar. 10, 2020

(87) PCT Pub. No.: WO2019/057228
PCT Pub. Date: Mar. 28, 2019

(65) Prior Publication Data
US 2020/0273130 A1    Aug. 27, 2020

(30) Foreign Application Priority Data
Sep. 20, 2017   (DE) .................. 10 2017 008 866.7

(51) Int. Cl.
*G05B 19/418*   (2006.01)
*G06Q 10/0633*  (2023.01)
(Continued)

(52) U.S. Cl.
CPC ..... *G05B 19/418* (2013.01); *G05B 19/41815* (2013.01); *G06Q 10/0633* (2013.01);
(Continued)

(58) Field of Classification Search
CPC .... G06Q 10/0633; G06Q 50/04; G06Q 10/08; G06Q 50/265; G06Q 50/28;
(Continued)

(56) References Cited

U.S. PATENT DOCUMENTS

2016/0251101 A1* 9/2016 Kong ................. B65B 35/30
53/445
2016/0363663 A1* 12/2016 Mindell ................ G01S 13/82
(Continued)

FOREIGN PATENT DOCUMENTS

| DE | 102007026399 | 11/2008 |
|---|---|---|
| DE | 102015010402 | 4/2016 |
| WO | 2013119942 | 8/2013 |

OTHER PUBLICATIONS

Heyer, Human-Robot Interaction and Future Industrial Robotics Applications, 2010 IEEE/RSJ International Conference on Intelligent Robots and Systems, Taipei, Taiwan, 4749 (2010) (Year: 2010).*

(Continued)

*Primary Examiner* — Charles Guiliano
(74) *Attorney, Agent, or Firm* — DUANE MORRIS, LLP; Gregory M. Lefkowitz; Randall C. Pyles

(57) ABSTRACT

Data system for organising workflows, in which the cooperation of human beings and machines is controlled intra-logistically with optimum protection for the human beings involved, having the following features: g) an intra-logistically relevant work area is divided into production or storage areas (1) that are accessible, by means of transport areas (7), to the human beings and machines involved in the work (Continued)

Figure 1:
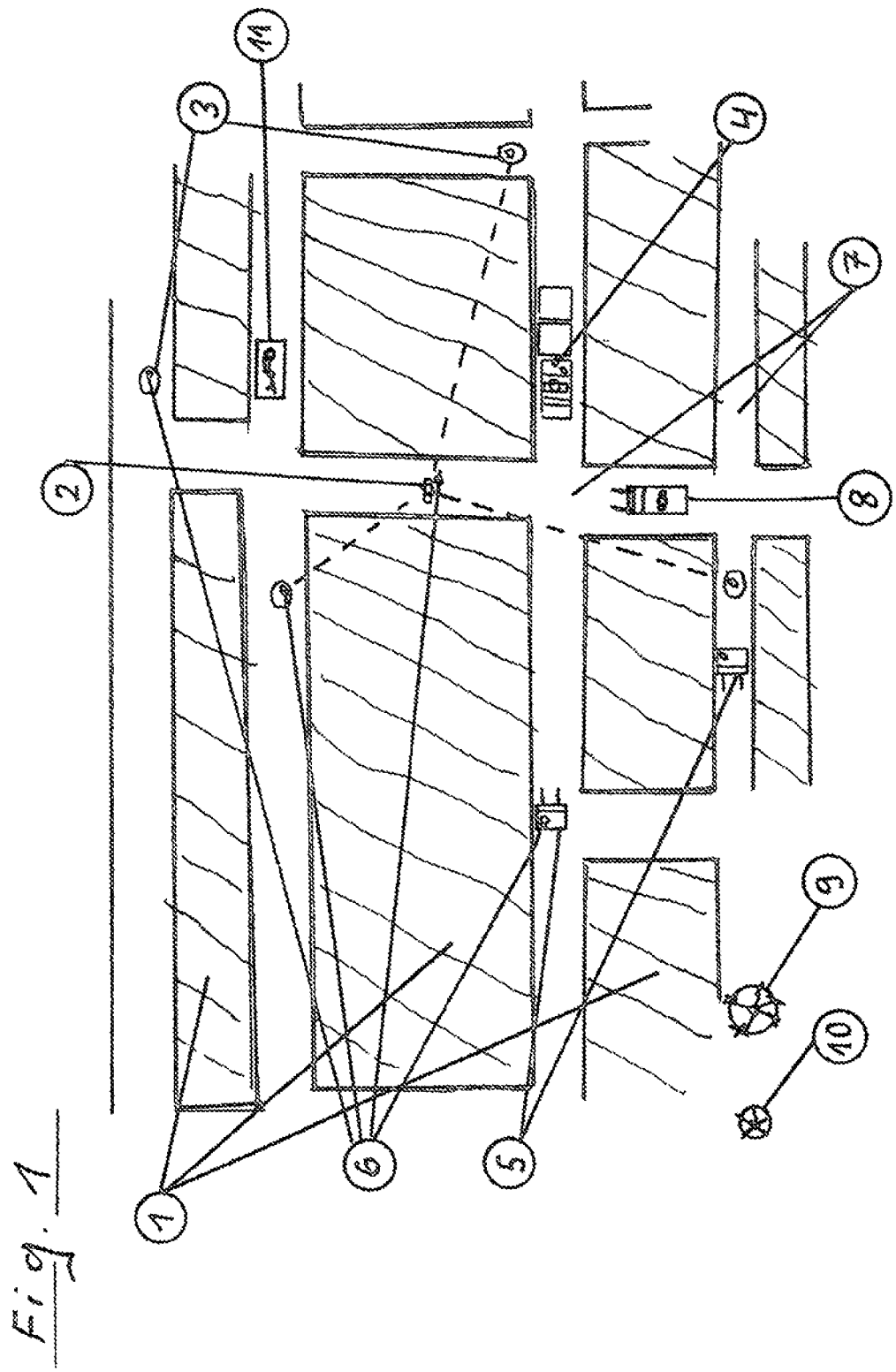

process without obstacles, wherein the transport areas (7) are completely available to data systems by means of expediently distributed radio subscribers as transmitters and receivers (6), and an intra-logistical manager system undertakes the superordinate control, h) numerous DTSs (driverless transport systems) in various configurations and manufacturer-specific control subsystems are usable, besides transport drones (9), for handling the transport tasks that arise, i) robots in various configurations and manufacturer-specific control subsystems are used, besides people (2) equipped with radios, for carrying out work that arises.

13 Claims, 4 Drawing Sheets

(51) Int. Cl.
  G06Q 10/08 (2023.01)
  G06Q 50/04 (2012.01)
  G06Q 50/26 (2012.01)
  G06Q 50/28 (2012.01)
  H04B 1/02 (2006.01)
  H04B 1/06 (2006.01)

(52) U.S. Cl.
  CPC ............ *G06Q 10/08* (2013.01); *G06Q 50/04* (2013.01); *G06Q 50/265* (2013.01); *G06Q 50/28* (2013.01); *G05D 2201/0216* (2013.01); *H04B 1/02* (2013.01); *H04B 1/06* (2013.01)

(58) Field of Classification Search
  CPC ............ G05B 19/418; G05B 19/41815; G05D 2201/0216; H04B 1/02; H04B 1/06
  USPC ........................................................ 705/7.27
  See application file for complete search history.

(56) References Cited

U.S. PATENT DOCUMENTS

| 2017/0103669 | A1* | 4/2017 | Silveratawil | A61B 5/0205 |
| 2017/0334456 | A1* | 11/2017 | Deligianni | B60W 50/14 |
| 2018/0339456 | A1* | 11/2018 | Czinger | G05B 19/418 |
| 2020/0130115 | A1* | 4/2020 | Vetter | B62D 65/18 |

OTHER PUBLICATIONS

Fahrerloses Transportfahrzeug [Driverless transport vehicle]. From: Wikipedia, the free encyclopedia; version dated: Aug. 31, 2017 at 00:47 UTC, URL: https://de.wikipedia.org/w/index.php?title=Fahrerloses_Transportfahrzeug&oldid=168632763.

Logistikdrohne [Delivery drone]. From: Wikipedia, the free encyclopedia; version dated: Apr. 12, 2017 at 21:23 UTC; URL: https://de.wikipedia.org/w/index.php?title=Logistikdrohne&oldid=164498346.

Arbeitsmittel [Work resources]. From: Wikipedia, the free encyclopedia; version dated: Apr. 6, 2017 at 18:16 UTC; URL: https://de.wikipedia.org/w/index.php?title=Arbeitsmittel&oldid=164304043.

VDI 2510, "Automated Guided Vehicle Systems (ADVS)", Oct. 1, 2005, https://www.vdi.de/uploads/tx_vdirili/pdf/9616158, retrieved from the Internet: Nov. 16, 2018, 39 pages.

* cited by examiner

DATA SYSTEM FOR ORGANIZING WORKFLOWS, IN WHICH THE COOPERATION OF HUMAN BEINGS AND MACHINES IS CONTROLLED INTRA-LOGISTICALLY WITH OPTIMUM PROTECTION FOR THE HUMAN BEINGS INVOLVED, AND METHOD FOR INSTALLATION THEREOF

CROSS-REFERENCE TO RELATED APPLICATIONS

This application is a § 371 national stage entry of International Application No. PCT/DE2018/000261, filed on Sep. 12, 2018, which claims priority to German Patent Application No. 10 2017 008 866.7, filed on Sep. 20, 2017, the entire contents of which are incorporated herein by reference.

The invention relates to a data system for organizing workflows, in which the cooperation of human beings and machines is controlled intra-logistically with optimum protection for the human beings involved and to a method for the installation thereof.

Since the earliest uses of mechanical aids to facilitate human work with the utilization of external energy, it has been an increasingly important issue when utilizing the external energy used to not endanger the human beings involved in the production process. However, since the application of electronic data processing during the production of mechanical components or in the organization of events has increasingly moved to the foreground, safety-technical requirements with respect to the human involvement has increasingly shifted into the region of endangering human integrity. This becomes clear for example with the war-technological use of drones or the civil use of assistance systems when driving cars and the susceptibility thereof as regards the evaluation of environmental influences.

With respect to the prior art, reference is made, among the patent literature, to document DE 10 2015 010 402 A1, which relates to the operation of a driverless transport vehicle. Said document involves the objective of increasing the efficiency of a driverless transport system.

Claim 1 of that document claims a method for operating a first driverless transport vehicle (FTF1) and a second driverless transport vehicle (FTF2), in which an order (A1) is requested by the first driverless transport vehicle (FTF1) from a database and the order is transmitted from the database to the first driverless transport vehicle (FTF1), which is characterized in that an event that has a higher priority for the first driverless transport vehicle (FTF1) than the order (A1) is captured by the first driverless transport vehicle (FTF1) and the order (A1) is transmitted to the second driverless transport vehicle (FTF2) in dependence on the capturing of the event.

Document DE 10 2007 026 399 B3 discloses a zone-oriented safety concept for independent transport systems, which has the objective of specifying a safety concept that operates in a zone-oriented fashion and is not expensive.

Claim 1 in this respect claims a method for selectively shutting down driverless transport systems (6) within a region (2) in which a multiplicity of driverless transport systems (6) drive with a multiplicity of production facilities (8) and/or processing units (10) upon triggering of at least one of a plurality of EMERGENCY-OFF switches (12) arranged in this region (2), having the following method steps:

a) safety-directed transmission of the activation of an EMERGENCY-OFF switch (12) and of information relating to an associated protection space (14) to all driverless transport systems (6) driving in the region (2),
b) transport-system-independent determination of in each case one position of each driverless transport system (6) within a region (2),
c) transport-system-based comparison of its determined position to a protection space (14) belonging to the activated EMERGENCY-OFF switch (12), and
d) independent shutdown of a driverless transport system (6) for which the position determination falls into the protection space (14) belonging to the activated EMERGENCY-OFF switch (12).

The present invention is based on the object of specifying an apparatus and a method which provide the possibility of creating a data system for organizing workflows, in which the cooperation of human beings and machines is controlled intra-logistically with optimum protection of the human beings involved.

This object is achieved by the features in claim 1:
a data system for organizing workflows, in which the cooperation of human beings and machines is controlled intra-logistically with optimum protection of the human beings involved, having the following features:
a) an intra-logistically relevant work region is divided into production or storage regions (1), which are accessible without obstruction for the human beings and machines involved in the work process via transport regions (7), wherein the transport regions (7) are data-technologically reachable without gap by way of expediently distributed radio subscribers as transmitters and receivers (6) and an intra-logistic process manager system assumes the superordinate control,
b) in addition to transport drones (9), numerous FTS (driverless transport systems) of various types and manufacturer-specific control subsystems are able to be used for dealing with the transport tasks that arise,
c) in addition to persons (2) who are equipped with radio devices, robots of different types and manufacturer-specific control subsystems are used for performing work that arises and independent radiolocation is performed by using the position of the individual driverless transport vehicles from their own localization systems,
wherein especially measured access points are dispensed with and the intra-logistically relevant work region additionally has, where necessary, expediently distributed orientation markers and alignment markers 20 for the orientation of all function carriers that are data-technologically reachable, and human workers are supported in their work by a robot (24) as a tool assistant and/or a robot assistant (28), and a robot (24) and/or a robot assistant (28) in each case have a sensor (25) for capturing 360°-views and a sensor (31) for capturing gripping functions, and by the method as claimed in claim 6:
a method for establishing a data-technological system for organizing workflows, in which the cooperation of human beings and machines is intra-logistically controlled with optimum protection of the human beings involved, having the following method features:
a) an intra-logistically relevant work region is divided into production or storage regions (1), which are accessible without obstruction for the human beings and machines involved in the work process via transport regions (7), wherein the transport regions (7) are data-technologically reachable without gap by way of expediently distributed transmitters and receivers (6) and an intra-logistic process manager system assumes the superordinate control, b) in addition to transport drones (9), numerous FTS (driverless transport systems) of various types and manufacturer-specific control subsystems are used for dealing with the transport tasks that arise, c) in addition to persons (2) who are equipped with WLAN devices, robots of different types and manufacturer-specific control subsystems are used for performing work that arises, and additionally claimed is the intra-logistically relevant work region for the orientation of all function carriers that are data-technologically reachable with, where necessary, additional expediently distributed orientation markers and alignment markers 20, and a computer program with a program code for performing the method steps if the program is executed in a computer, and machine-readable carriers with the program code of a computer program for performing the method if the program is executed in a computer.

The invention will be described in more detail below.

Figure 2:
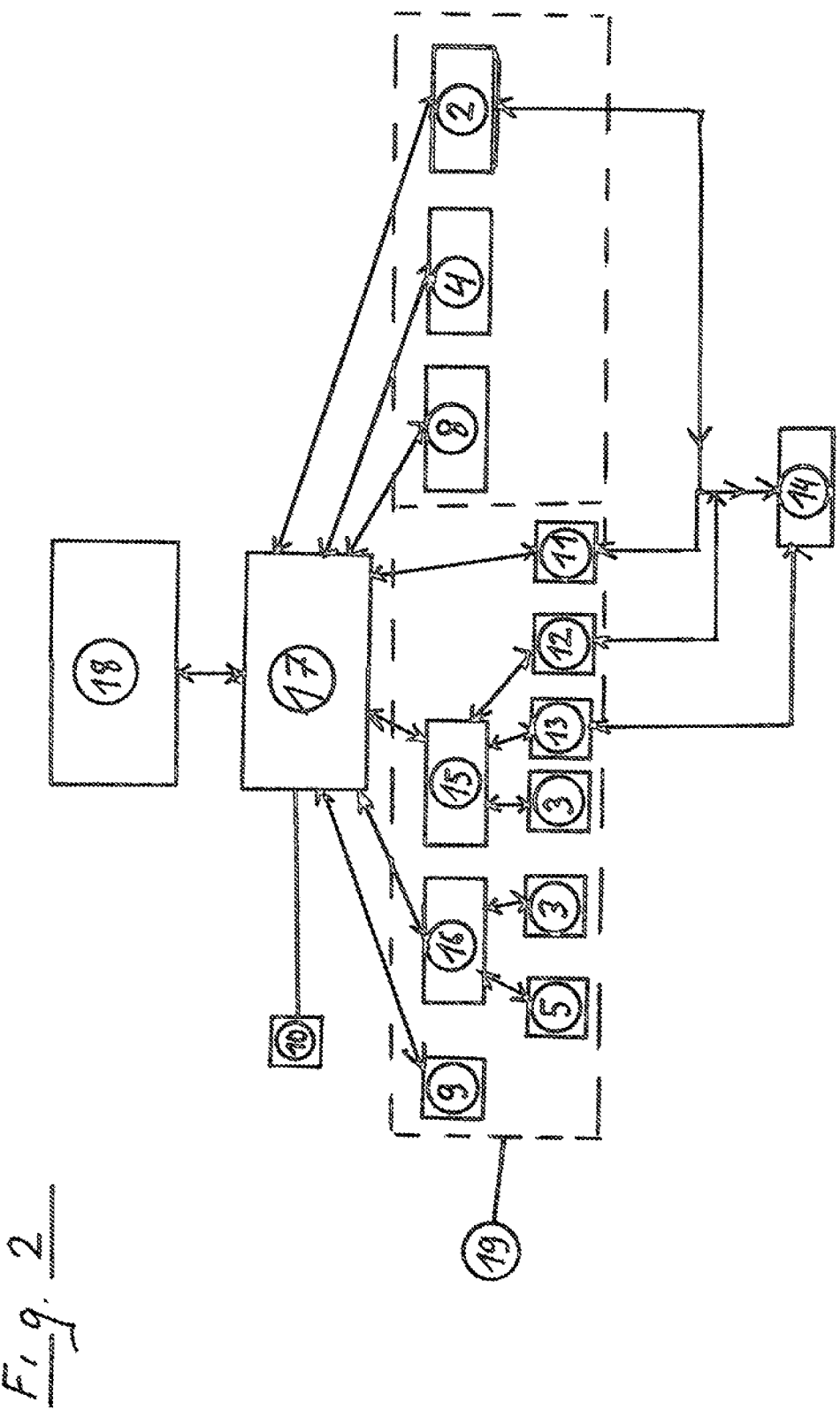
Figure 3:
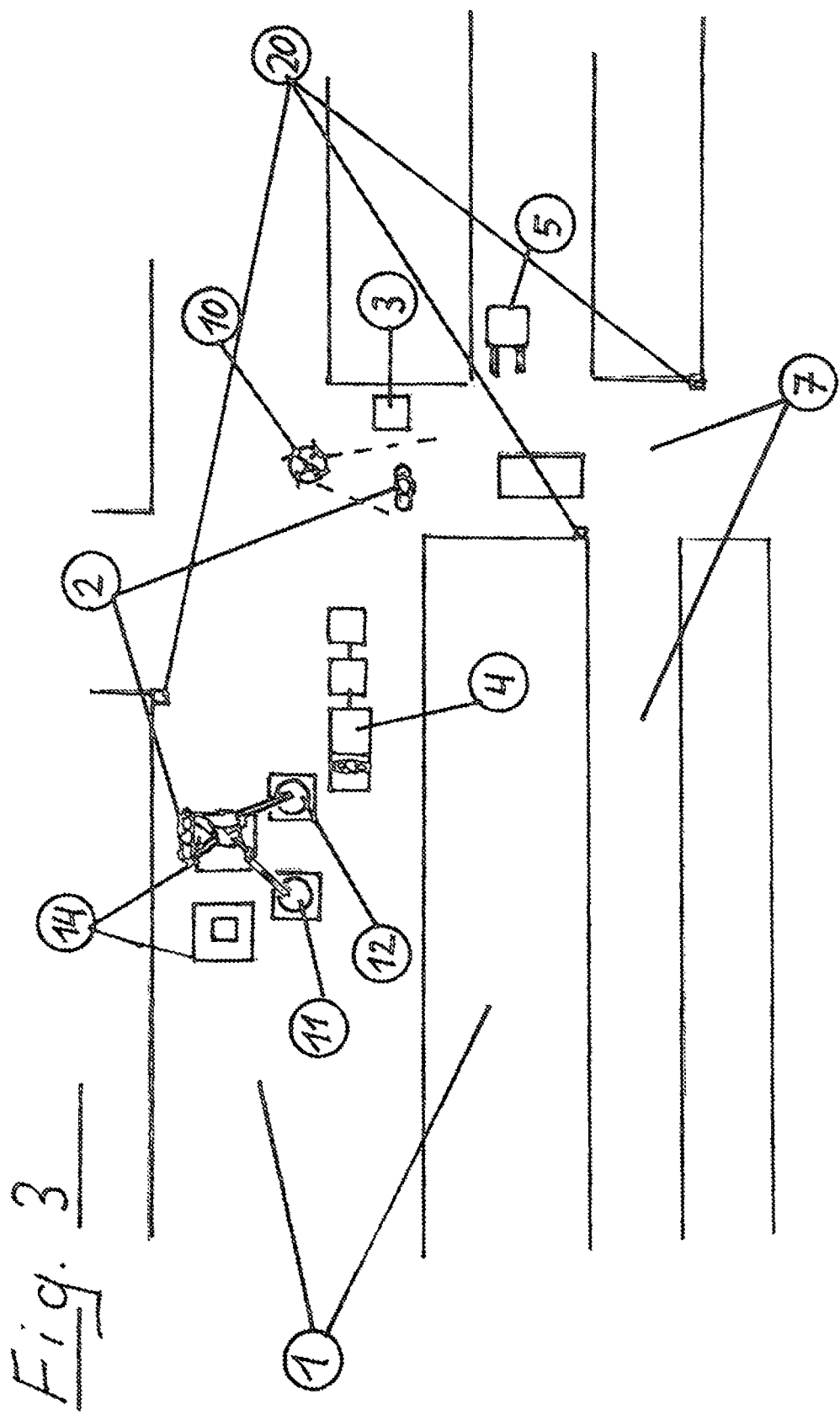
Figure 4:
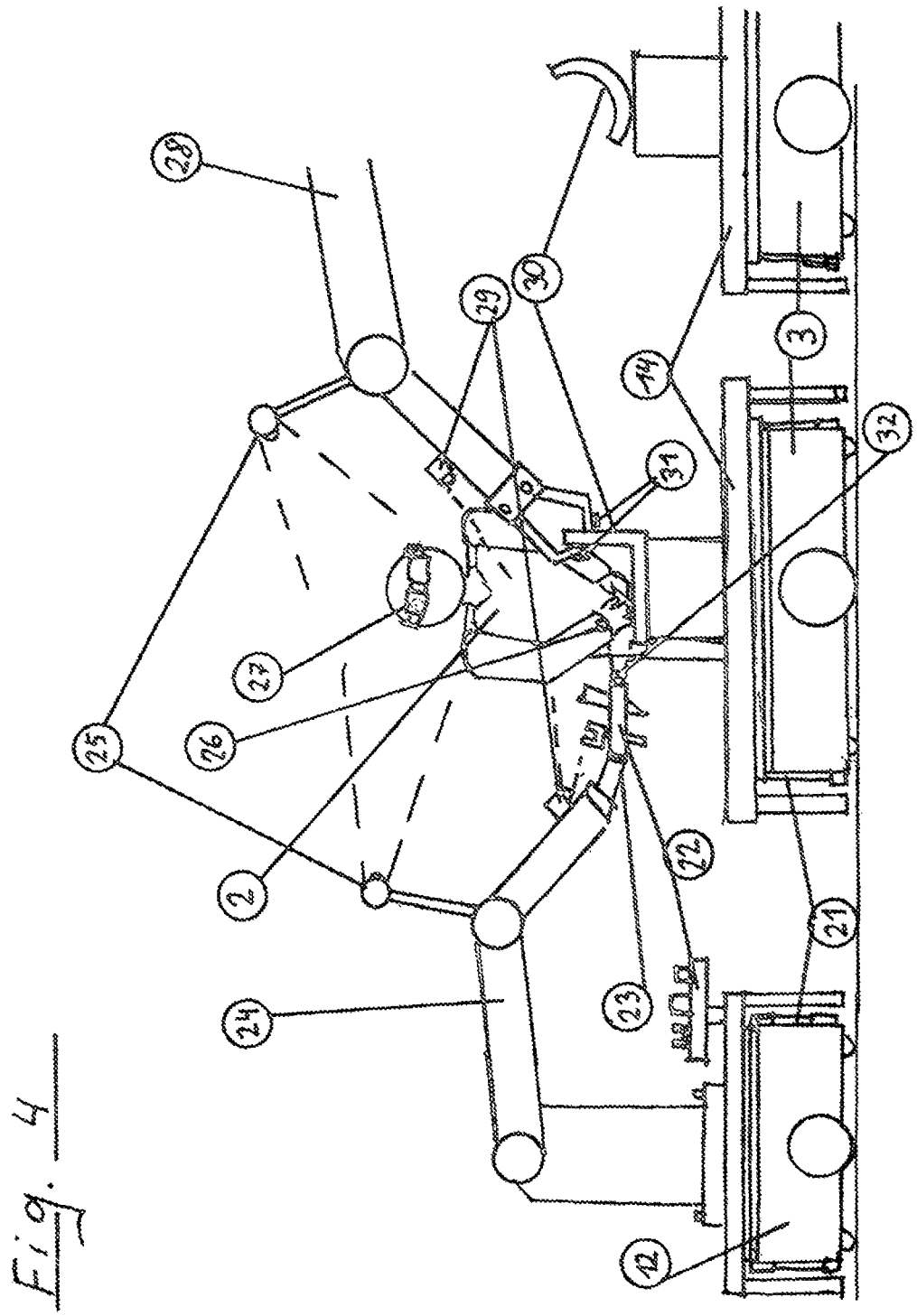

Specifically, in the figures:

FIG. 1: shows an overview of the influence region of an intra-logistic process region FIG. 2: shows details of an intra-logistic process region FIG. 3: shows interactions of an intra-logistic process region FIG. 4: shows an exemplary work region within an intra-logistic process region FIG. 1: shows an overview of the influence region of an intra-logistic process region.

Any type of production regions and/or storage regions or commission regions can be considered to be an intra-logistic work region. Such a region is denoted in FIG. 1 with 1. In such an intra-logistic work region, for example, different persons 2 who are equipped with a radio device, for example a WLAN device, can appear, wherein in this case any type of technological device that is data-technologically connected to the overall system by way of a radio link is conceivable. Furthermore, FIG. 1 shows what are known as FTS (driverless transport systems), which are likewise data-technologically connected to the overall system. An electric hoist with a driver is denoted with 4 as a further example of a data-technologically relevant participant that may be present in the intra-logistic work region. Independently driving forklift trucks 5 can also participate in the movement of goods in the intra-logistic work region shown in FIG. 1. For example four different WLAN transmitters 6 are shown in the overall image for operating the illustrated transport participants. Transport aisles 7 between different production or storage regions are necessary for the movement of goods and the production workflow. Forklift trucks 8 with drivers also need to be data-technologically taken into account in the intra-logistic overall network. Moreover, the airspace also needs to be taken into consideration, in which not only transport drones 9 required for the movement of goods but also monitoring drones 10 must be data-technologically supplied with information in a targeted fashion.

11 additionally denotes an FTS which carries a robot in FIG. 1, wherein such an FTS is controlled by the process manager.

The prerequisite for the data system according to the invention is the localization of all involved human beings and machines within the intra-logistically relevant work regions by way of the signal times of flight of electromagnetic waves, such as for example WLAN. The exact position determination of human beings and machines, the position of which is not yet known, is done in a decentralized fashion and relatively, on the basis of a calculation algorithm in relation to network subscribers, which for their part already had their exact positions determined.

Using the positions of individual driverless transport vehicles from their own localization systems, separate radiolocation can be performed. For this reason, it is possible, for example, to dispense with access points measured especially in the hall, as is otherwise required. In addition, each radio subscriber can have for exampple data glasses and thereby determine his position. The drivers of industrial trucks or vehicles of other driverless transport systems can then be localized in the region of the above-described radio network on the basis of said radio subscribers. In this way, additional information can also be captured.

FIG. 2: shows details of an intra-logistic process region. FIG. 2 shows the intra-logistic manager system 17 as a central reference point as part of the overall system 18 for product management and/or product manufacture.

In the right-hand part of FIG. 2, persons 2 having a WLAN device, the electric hoist 4 with driver and the forklift truck 8 with driver can here be seen as human components, as it were, of the intra-logistic manager system 17.

On the left-hand side of FIG. 2, by contrast, the transport drones 9, the manufacturer-specific FTS with their subsystem A and the manufacturer-specific FTS with their subsystem B are combined in organizational fashion in the drawing. Here, FTS 3 for transport and FTS 13 for transport of assembly platforms are organizationally combined in the subsystem A, and, FTS 3 for transport, independently driving forklift trucks 5 and FTS 12 with a robot, which are controlled by a subsystem, are organizationally combined in the subsystem B. The FTS 11 with a robot controlled by the process manager are treated separately in organizational terms in the intra-logistic manager system 17, as are the monitoring drones 10. An independently moving assembly platform 14 can automatically enter into data communication with the FTS 11, 12 and 13 and with the persons 2 who are in possession of a WLAN device. Particular care is taken that the persons 2 who are in possession of a WLAN device have a data technologically short connection to the FTS, which are controlled by the process manager, and the independently moving assembly platform 14.

The entire cooperation region for product management and for product manufacture is denoted with 19.

FIG. 3: shows interactions of an intra-logistic process region.

1 denotes here production and storage regions as in FIG. 1, wherein these regions are separated by transport aisles 7. In the transport region 7 shown at the top left, for example an electric hoist 4 with a driver can be seen, wherein, in the immediate vicinity, two persons 2 having a WLAN device and an FTS 3 for transport in the direct vicinity of a monitoring drone 10 are located. An independently driving forklift truck 5 is shown in the next transport region 7. In the first-mentioned transport region 7, furthermore two independently moving assembly platforms 14 can be seen next to an FTS 11 and an FTS 12. Orientation markers and alignment markers 20 for FTS and other function carriers such as drones and persons are illustrated as safety backup in distributed fashion in the capturing region of the aforementioned transport aisles.

FIG. 4 shows an exemplary work region within an intra-logistic process region.

At the center of FIG. 4, a human worker, a person 2 having a WLAN device, can be seen wearing data glasses 27 with a camera and carrying, on his wrist, a sensor 26 for measuring the skin resistance 26 on his hand that performs the work. Using such a sensor 26, it is possible to immediately detect when the worker becomes anxious, may cause uncertainties in the production process and should therefore be replaced as soon as possible. Shown on the ground of the work region are two FTS 3 which have arrived one behind the other next to an FTS 12 with a robot, controlled by a subsystem, wherein the FTS 12 communicates with the FTS 3 which has arrived next to it using data for example distance, speed generated by the laser scan sensor 21, wherein the two FTS 3 in each case have independently moving assembly platforms 14. The work region located immediately in front of the person 2 with a product 30 shown is assisted by a robot 24 as a tool assistant on the left-hand side via a tool interchanger 23, which helps itself from a tool bar 22, and a sensor 32 for monitoring the human hands. To the right of the person 2, the production process is monitored using a robot assistant 28 and a sensor 31 for monitoring gripping functions.

Both robots 24 and 28 have in their work region in each case a sensor 25 for capturing 360°-views and a sensor 29 for monitoring gripping functions.

LIST OF REFERENCE SIGNS 1 production or storage regions
2 person having a radio device
3 FTS (driverless transport system, vehicle) for transport
4 electric hoist with driver
5 independently driving forklift truck
6 transmitter and receiver (e.g. WLAN device)
7 transport regions (aisle)
8 forklift truck with driver
9 transport drone
10 monitoring drone
11 FTS with a robot, controlled by process manager
12 FTS with a robot, controlled by a subsystem
13 FTS for transport of assembly platforms
14 independently moving assembly platform
15 subsystem A (manufacturer-specific control system for FTS)
16 subsystem B (manufacturer-specific control system for FTS)
17 intra-logistic manager system
18 system for product management and product manufacture
19 cooperation region of the transport and tool media
20 orientation markers and alignment markers (e.g. for FTS)
21 laser scan sensor
22 tool bar
23 tool interchanger
24 robot as tool assistant
25 sensor for capturing 360°-views
26 sensor for measuring skin resistance
27 smartglasses with camera
28 robot assistant for product fixing and product reloading
29 sensor with laser scanner as a way of monitoring gripping functions
30 product
31 sensor for monitoring gripping functions
32 sensor for monitoring human hands

The invention claimed is:

1. A data system for organizing workflows, in which cooperation of human beings and machines is controlled intra-logistically with protection of the human beings involved, the data system comprising:
an intra-logistically relevant work region that is divided into (i) production or storage regions, which are accessible without obstruction for the human beings and the machines involved in a work process via transport regions, wherein the transport regions are data-technologically reachable without gap by way of distributed radio subscribers as transmitters and receivers and (ii) an intra-logistic process manager system having superordinate control,
a transport drone that moves goods within the work region,
a driverless transport system including a first manufacturer-specific control subsystem that handles transport tasks that arise within the work region,
a human worker who is working on a product in front of the worker and is equipped with a radio device, the radio device being a distributed radio subscriber, wherein the worker is further equipped with a sensor that measures skin resistance that detects when the worker becomes anxious and in response to detection of an anxious worker, replacing the worker who is working on the product with another worker,
an independently moving assembly platform that automatically enters into direct data communication with the driverless transport system and the human worker, and
a first robot including a second manufacturer-specific control subsystem that provides tools to the worker and includes a sensor to monitor a hand of the worker, wherein
localization of the human beings and the machines within the work region is realized by way of signal times of flight of electromagnetic waves.

2. The data system as claimed in claim 1, wherein
the driverless transport system includes a localization system, and
independent radiolocation is performed by using a position of the driverless transport system from the localization system, wherein especially measured access points are dispensed with.

3. The data system as claimed in claim 1, wherein the intra-logistically relevant work region includes, distributed orientation markers and alignment markers for orientation of all function carriers that are data-technologically reachable.

4. The data system as claimed in claim 1, wherein a second robot that assists the worker includes a sensor to capture 360°-views and a sensor for capturing gripping functions.

5. The data system as claimed in claim 1, wherein each radio subscriber has data glasses that are used to determine their position.

6. The data system as claimed in claim 1, wherein
the transport drone and the driverless transport system are organizationally combined in a first subsystem of the intra-logistic process manager system, and
the first robot is organizationally combined in a second subsystem of the intra-logistic process manager system.

7. A method for establishing a data-technological system for organizing workflows, in which cooperation of human beings and machines is intra-logistically controlled with protection of the human beings involved, the method comprising:
dividing an intra-logistically relevant work region into (i) production or storage regions, which are accessible without obstruction for the human beings and the machines involved in a work process via transport regions, wherein the transport regions are data-technologically reachable without gap by way of distributed transmitters and receivers and (ii) an intra-logistic process manager system providing superordinate control, and tracking the location of:
- a transport drone that moves goods within the work region,
- a driverless transport system including a first manufacturer-specific control subsystem to handle transport tasks that arise within the work region,
- a human worker who is working on a product in front of the worker and is equipped with a distributed transmitter, wherein the worker is further equipped with a sensor that measures skin resistance that detects when the worker becomes anxious and in response to detection of an anxious worker, replacing the worker who is working on the product with another worker,
- an independently moving assembly platform that automatically enters into direct data communication with the driverless transport system and the human worker, and
- a first robot including a second manufacturer-specific control subsystem that provides tools to the worker and includes a sensor to monitor a hand of the worker, wherein localization of the human beings and the machines within the work region is realized by way of signal times of flight of electromagnetic waves.

8. The method as claimed in claim 7, wherein the intra-logistically relevant work region has, for orientation of all function carriers that are data-technologically reachable, additional distributed orientation markers and alignment markers.

9. The method as claimed in claim 7, wherein the human worker has data glasses that are used to determine their position.

10. The method as claimed in claim 7, wherein
the transport drone and the driverless transport system are organizationally combined in a first subsystem of the intra-logistic process manager system, and
the first robot is organizationally combined in a second subsystem of the intra-logistic process manager system.

11. A non-transitory computer-readable medium storing instructions that, when executed by a computer, cause the computer to perform a method comprising:

dividing an intra-logistically relevant work region into (i) production or storage regions, which are accessible without obstruction for the human beings and the machines involved in a work process via transport regions, wherein the transport regions are data-technologically reachable without gap by way of distributed transmitters and receivers and (ii) an intra-logistic process manager system providing superordinate control, and tracking the location of:
- a transport drone that moves goods within the work region,
- a driverless transport system including a first manufacturer-specific control subsystem to handle transport tasks that arise within the work region,
- a human worker who is working on a product in front of the worker and is equipped with a distributed transmitter, wherein the worker is further equipped with a sensor that measures skin resistance that detects when the worker becomes anxious and in response to detection of an anxious worker, replacing the worker who is working on the product with another worker,
- an independently moving assembly platform that automatically enters into direct data communication with the driverless transport system and the human worker, and
- a first robot including a second manufacturer-specific control subsystem that provides tools to the worker and includes a sensor to monitor a hand of the worker, wherein localization of human beings and machines within the work region is realized by way of signal times of flight of electromagnetic waves.

12. The non-transitory computer-readable medium as claimed in claim 11, wherein the human worker has data glasses that are used to determine their position.

13. The non-transitory computer-readable medium as claimed in claim 11, wherein
the transport drone and the driverless transport system are organizationally combined in a first subsystem of the intra-logistic process manager system, and
the first robot is organizationally combined in a second subsystem of the intra-logistic process manager system.

\* \* \* \* \*

UNITED STATES PATENT AND TRADEMARK OFFICE
CERTIFICATE OF CORRECTION

| | | |
|---|---|---|
| PATENT NO. | : 11,927,941 B2 | |
| APPLICATION NO. | : 16/646026 | |
| DATED | : March 12, 2024 | |
| INVENTOR(S) | : Philipp Marb and Erwin Herre | |

It is certified that error appears in the above-identified patent and that said Letters Patent is hereby corrected as shown below:

On the Title Page

Under item (22) PCT Filed, replace Filing Date name from:
Sep.20, 2018
To:
Sep. 12, 2018

Signed and Sealed this
Ninth Day of July, 2024

Katherine Kelly Vidal
*Director of the United States Patent and Trademark Office*